(12) United States Patent
Lang et al.

(10) Patent No.: US 6,349,916 B1
(45) Date of Patent: Feb. 26, 2002

(54) ASSEMBLY FOR ADJUSTABLY MOUNTING VEHICLE EXTERNAL MIRROR

(75) Inventors: Heinrich Lang, Ergersheim; Albrecht Popp, Weihenzell, both of (DE)

(73) Assignee: Mekra Lang GmbH & Co. KG, Furth (DE)

( * ) Notice: Subject to any disclaimer, the term of this patent is extended or adjusted under 35 U.S.C. 154(b) by 0 days.

(21) Appl. No.: 09/625,262

(22) Filed: Jul. 25, 2000

Related U.S. Application Data

(62) Division of application No. 09/115,197, filed on Jul. 15, 1998, now Pat. No. 6,092,778.

(30) Foreign Application Priority Data

Nov. 4, 1997 (DE) .......................... 197 48 626

(51) Int. Cl.$^7$ ................................. A47G 1/24
(52) U.S. Cl. ................ 248/476; 248/183.3; 248/183.4; 248/478
(58) Field of Search ............... 248/478, 476, 248/408, 183.3, 183.4, 292.12; 16/322, 331, 332, 334, 321; 403/92, 93, 96, 97, 95; 74/551.3, 557 R, 557 M

(56) References Cited

U.S. PATENT DOCUMENTS

| 326,876 A | * | 9/1885 | Kramer et al. ................. 81/61 |
| 994,148 A | * | 6/1911 | Gardner ........................ 403/93 |
| 1,595,557 A | * | 8/1926 | Mamiya .................... 74/551.4 |
| 3,107,077 A | * | 10/1963 | Lassa ........................... 403/93 |
| 3,352,580 A | * | 11/1967 | Kurz et al. .................. 248/478 |
| 3,368,847 A | * | 2/1968 | Langmead .................. 297/366 |
| 3,384,334 A | * | 5/1968 | Malachowski .............. 248/478 |
| 3,637,186 A | * | 1/1972 | Greenfield .................. 248/478 |

(List continued on next page.)

FOREIGN PATENT DOCUMENTS

| AU | 240966 | * | 6/1960 |
| CH | 378106 | * | 5/1964 |
| NL | 285897 | * | 2/1965 |

Primary Examiner—Anita King
Assistant Examiner—Naschica S. Morrison
(74) Attorney, Agent, or Firm—Dority & Manning, P.A.

(57) ABSTRACT

An assembly is disclosed for adjustably mounting a vehicle external mirror, the assembly including a first arm segment for securing to the vehicle a second arm segment for securing to the external mirror, and an axle member secured to one of the first and second arm segments and extending through an opening defined through the other of the first and second arm segments, the axle member defining a swivel axis therethrough and the first and second arm segments being pivotable and adjustably securable relative to each other about the swivel axis. A securing member is attached to the axle member for securing the first and second arm segments together about the axle member, and a bearing brace has a fixed end secured to the one of the first and second arm segments and a free end extending from the fixed end, the bearing brace configured and secured so as to extend in the direction of a plane substantially parallel to the swivel axis and to extend spaced from the swivel axis, the bearing brace forming a leaf spring acting substantially perpendicular to the swivel axis. A plurality of teeth extend from a first surface disposed on the free end of the bearing brace toward the other of the first and second arm segments, or extend from a first surface disposed on either the free end of the bearing brace toward the other of the first and second arm segments. A plurality of grooves are defined in a second surface opposing the first surface, the second surface being disposed on the other of the first and second arm segments to which the bearing brace fixed end is not secured. The grooves receive the teeth in any of at least two different adjustable orientations to thereby adjustably secure the first arm segment to the second arm segment.

29 Claims, 3 Drawing Sheets

U.S. PATENT DOCUMENTS

| | | | | |
|---|---|---|---|---|
| 3,722,304 A | * | 3/1973 | Obermann | 74/112 |
| 3,779,655 A | * | 12/1973 | Toyota | 403/93 |
| 4,829,633 A | * | 5/1989 | Kassner | 16/322 |
| 5,467,666 A | * | 11/1995 | Soucie et al. | 74/575 |
| 5,544,925 A | * | 8/1996 | Ikeda | 292/216 |
| 5,678,798 A | * | 10/1997 | Little | 248/289.11 |
| 5,787,761 A | * | 8/1998 | Wang | 74/535 |
| 6,116,580 A | * | 9/2000 | Hull | 254/357 |

* cited by examiner

US 6,349,916 B1

ASSEMBLY FOR ADJUSTABLY MOUNTING VEHICLE EXTERNAL MIRROR

The present application is a divisional application based on U.S. patent application Ser. No. 09/115,197, filed Jul. 15, 1998, issued as U.S. Pat. No. 6,092,778.

BACKGROUND OF THE INVENTION

The present invention relates to a holding arm for an external motor vehicle mirror with an integrated swivel articulation capable of snapping in in at least one position.

A mirror arm mechanism of this type is known from EP 0 641 686 A2. With the swivel articulation shown there, the different snap-in elements are subjected to the force of a helicoidal screw spring in the direction of engagement of the snap-in mechanism. The embodiments shown therein have in common that different axially and radially acting wedge surfaces intermesh on rings or ring segment elements seated within each other in a relatively complex manner. To this extent the known swivel articulation is of complicated design and its assembly is expensive. Furthermore with the known swivel articulation, especially with an embodiment in which different separate ring segments are used to constitute snap-in wedge surfaces, the snap-elements can jam with each other. This would block the swivel articulation which could no longer carry out its safety function, i.e. swiveling back when the external mirror supported by the holding arm impacts an obstacle. Due to blocking or at least due to the sluggishness caused by the interaction of the various internal parts of the swivelling articulation, the manual swiveling of the mirror, e.g. to pass narrow passages, is rendered more difficult.

With respect to the state of the art it should be pointed out as a general background that with such holding arms with snap-in swivel articulation, articulation designs are often used where the arm segments emanating from the swiveling articulation are offset relative to each other during snapping in and out of the swiveling articulation. This offset has been compensated for in the past by the elasticity of holding arms of considerable length.

Modern, up-to-date mirror designs often have only very short holding arms however, which extend directly in horizontal direction from the vehicle body to the mirror housing. Especially with these designs, the clearance for length compensation is very limited. One solution of this problem is already provided by the above-mentioned EP 0 641 686 A2, however with the above-mentioned disadvantages.

OBJECTIVES AND SUMMARY OF THE INVENTION

On the basis of the above, the invention has as an object to present a holding arm with snap-in swiveling articulation whereby the two arm segments can be adjusted as before relative to each other without shifting and while the swiveling articulation snaps in and out, but whereby the swivel or snap-in mechanism is simpler and thereby easier to assemble, and is more compact.

This object is attained through the characteristics of some aspects of the present invention. According to these the holding arm according to the invention is basically an arm that is continuous at least in the area of the swiveling articulation, whereby the swiveling axis of the swiveling articulation formed between the two arm segments is at a right angle to the longitudinal direction of the arm segments. The counter-snap-in element under spring pressure in the direction of engagement with the snap-in element is suspended according to the invention at the free end of a bearing brace made like a leaf spring which is attached by its fixed end to this appertaining arm segment.

The leaf-spring bearing brace ensures on the one hand that the counter-snap-in element is under spring pressure, and on the other hand provides the excursion path of the counter-snap-in element when an arm segment is swiveled relative to the other arm segment. Finally the bearing brace also ensures non-rotatable holding of the counter-snap-in element, so that corresponding wedge and groove connections of the counter-snap-in element with its appertaining arm segment, as is required in the state of the art, may be omitted.

Preferred embodiments as well as other characteristics, details and advantages of the invention are contained in the sub-claims or in the description below, in which examples of embodiments of the object of the invention are explained through attached drawings.

DESCRIPTION OF THE PREFERRED EMBODIMENTS

Figure 1:
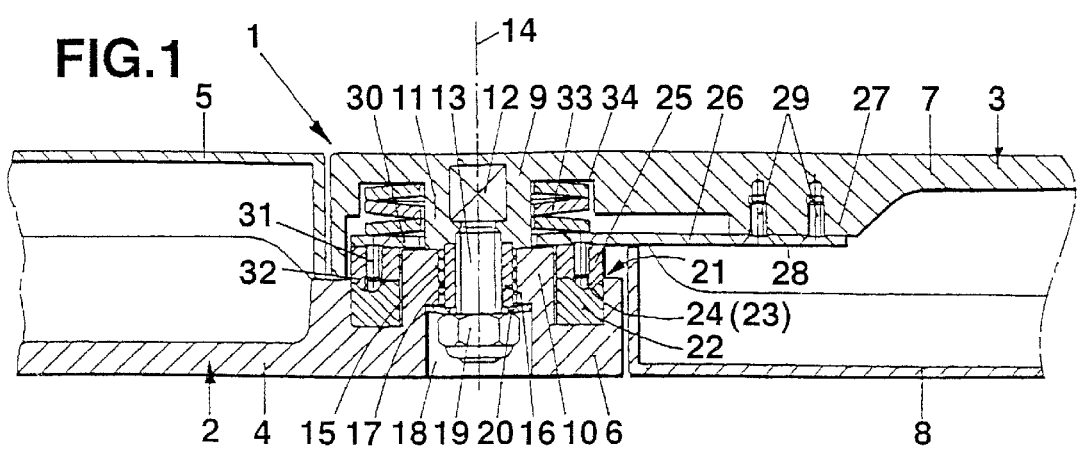
FIG. 1 shows a vertical longitudinal section through the swiveling articulation of a holding arm in a first embodiment of the present invention.

Reference will now be made in detail to the presently preferred embodiments of the present invention, one or more examples of which are illustrated in the drawings. Each example is provided by way of explanation of the invention, and is not meant as a limitation of the invention. For example, features illustrated or described as part of one embodiment can be used on another embodiment to yield yet another embodiment, and it is intended that the present invention include such modifications and variations.

Figure 4:
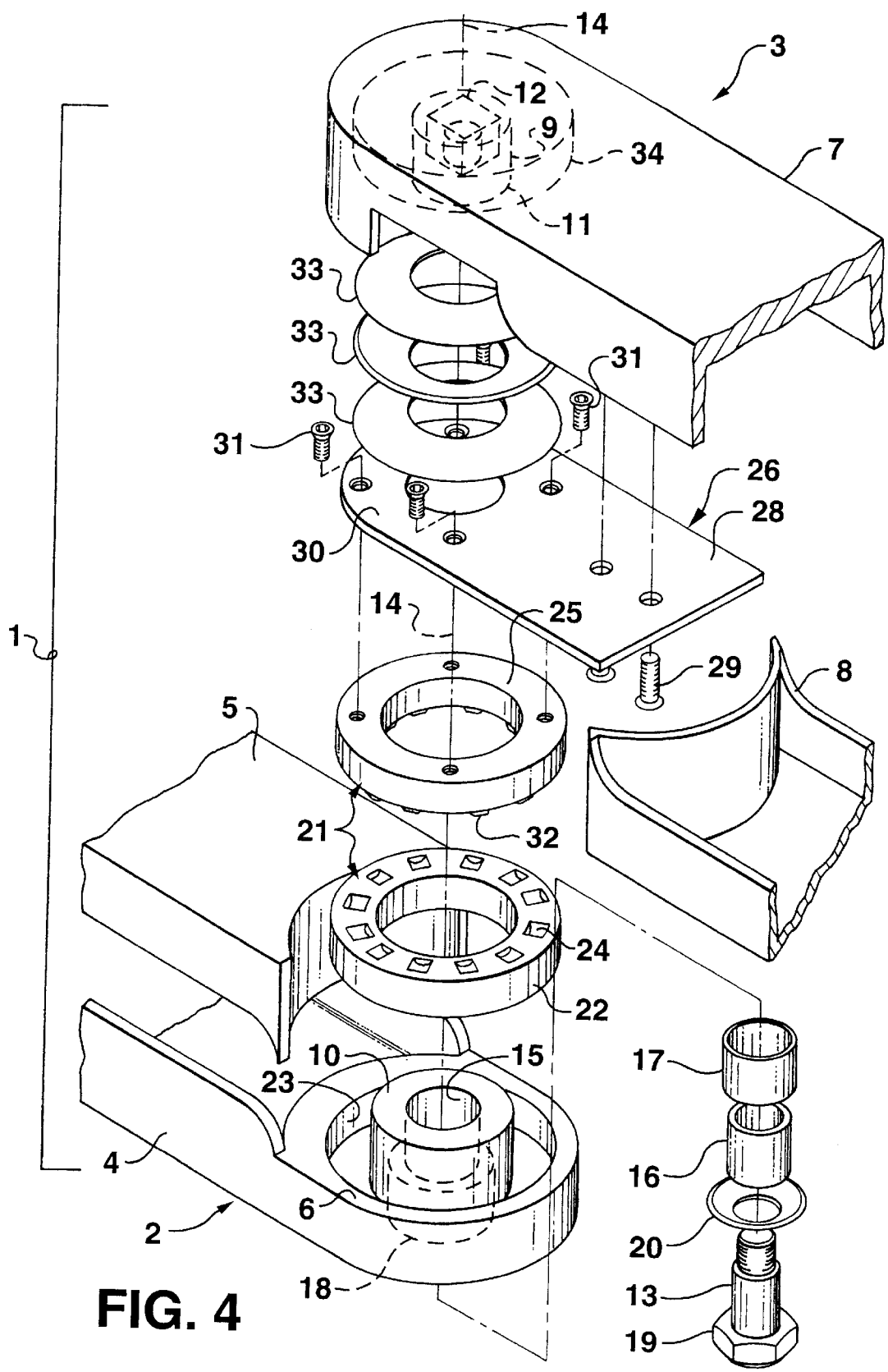
FIG. 4 shows an exploded perspective view of the embodiment of FIG. 1.

In the embodiment shown in FIGS. 1 and 4, the swiveling articulation designated generally by reference 1 connects the two arm segments 2, 3 of a holding arm of an external truck mirror. The arm segment 2 shown in FIG. 1 on the left side consists of a bearing pressure-cast part 4 located below, which leads to the truck body. The part 4 is covered by a screen (or cover) 5 which leaves the end 6 free for the formation of the swiveling articulation.

The arm segment 3 which extends to the right on FIG. 1 is provided on top with a bearing pressure-cast part 7 which supports the external mirror on its end which is not shown. On the underside of the pressure-cast part 7 a screen (or cover) 8 is also placed, leaving the end 9 of the arm segment 3 free.

On this end 9 a kind of axle stump 11 is integrally formed, into which the end of a threaded bolt (or axle member) 13 including a square block 12 is incorporated by casting and is thus non-rotatably connected to it. The axle stump 11 is a coaxial with the threaded bolt 13 which defines the swivel axis 14 of the swiveling articulation 1.

For interaction with the threaded bolt 13, the low-lying end 6 of the arm segment 2 which overlaps the higher-lying end 9 of the arm segment 3 is provided with an integral sleeve extension 10, the central bore 15 of which has a diameter such that a spacer sleeve 16 and on top of it a gliding sleeve 17 can be inserted between the arm segment 3 and bore 15. Pointing down, a mounting bore 18 with wider diameter in which the threaded bolt 13 end follows the bore 15. By screwing on a nut (or securing member) 19 with an interposed spring washer 20, the two arm segments 2, 3 can be connected to each other without clearance in the direction of the swivel axis 14 but are able to swivel around the latter. The faces of the axle stump 11 and of the sleeve extension 10 then come into contact with each other, but are not screwed together so tightly, due to the spacer sleeve 16 and the spring washer 20, that swiveling becomes impossible.

The swiveling articulation 1 can be snapped in, at least in the extended starting position shown in FIG. 1, by means of a snap-in device designated generally by reference 21. The snap-in device 21 is provided with a snap-in ring 22 assigned to the arm segment 2 as a first snap-in element, said snap-in ring 22 being held non-rotatably in an annular groove 23 open on top in the end 6 of the arm segment 2. The snap-in ring 22 has several snap-in grooves 24 distributed over the circumference of its upper face, said grooves having a trapezoid profile in circumferential as well as in radial direction (as can be seen in FIG. 1).

A counter-snap-in ring 25 which is associated with the upper arm segment 3 interacts with the snap-in ring 22. The counter-snap-in ring 25 is suspended on a bearing brace 26 which runs parallel to the longitudinal direction of the upper arm segment 3 and at a right angle to the swivel axis 14 to a bearing block 27 located spaced from end 9 of the arm segment 3. The bearing brace 26 is in form of a punched-out leaf spring sheet-metal part, the shaft of which is attached by its fixed end 28 on the bearing block 27 by means of attachment screws 29. The free end of the bearing brace 26 is made integrally with a shaft made in form of an anchoring ring 30, the contour of which essentially follows the contour of the counter-snap-in ring 25 as seen from above. Additional attachment screws 31 attach the counter-snap-in ring 25 to the anchoring ring 30 of the bearing brace 26.

FIG. 1 clearly shows that the counter-snap-in ring 25 has snap-in noses 32 on its face pointing down which have complementary contours to the snap-in grooves 24. The bearing brace 26 in form of a leaf spring ensures that the snap-in noses 32 enter the snap-in grooves 24, and this is further assisted by a Belleville spring package 33 threaded on the axle stump 11. The latter is located between the back of the anchoring ring 30 away from the counter-snap-in ring 25 and a counter bearing 34 at the end 9 of the arm segment 3.

As can be further seen in FIG. 1, the swivel articulation 1 is completely integrated into the cross-sectional contour of the arm segments 2, 3 since it protrudes neither upward nor downward, nor on the sides beyond the outside of the arm segments 2, 3.

Concerning the function of the swivel articulation 1 with axial snap-in, it should be pointed out briefly that as a torque is exerted on the arm segment 3, this is transmitted via the bearing brace 26 to the counter-snap-in ring 25 causing it to be lifted by the bearing brace 26 and the Belleville spring package 33 up and with its snap-in noses 32 out of the snap-in grooves 24 of the snap-in ring 22 against the force of the spring, and the arm segment 3 becomes capable of swiveling relative to the arm segment 2. At the same time there results no shift of the arm segment 2 relative to the arm segment 3 in direction of the swivel axis 14. The object of the invention thus strives for a clearance-free, flat and very compact swivel snap-in in a holding arm for motor vehicle external mirrors. By providing a plurality of equidistant snap-in grooves 24 and snap-in noses 32 on the snap-in ring 22 or on the counter-snap-in ring 25, a step by step snapping in of the swivel articulation 1 is furthermore possible.

Figure 2:
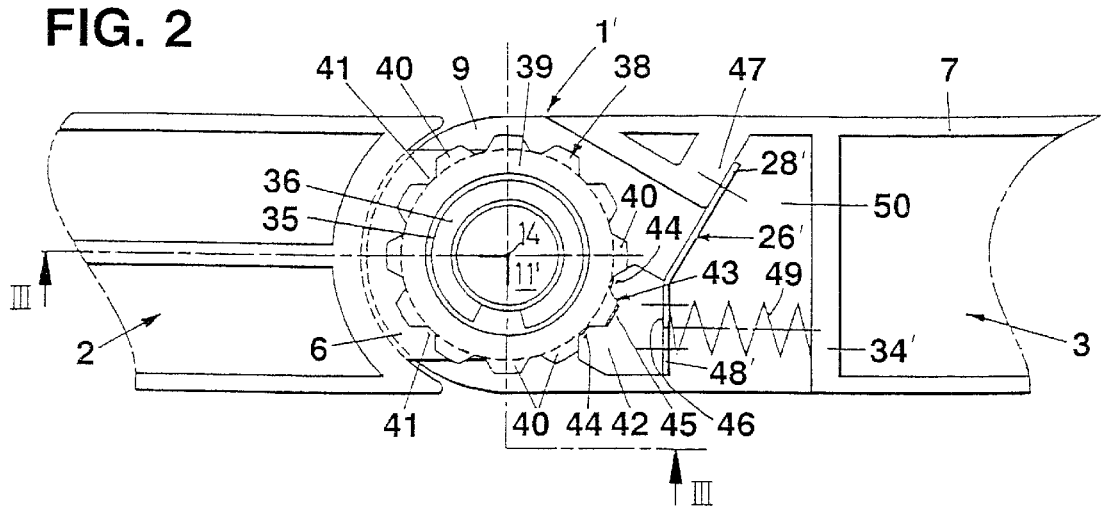
FIG. 2 shows a top view of a swiveling articulation in a second embodiment of the present invention.
Figure 3:
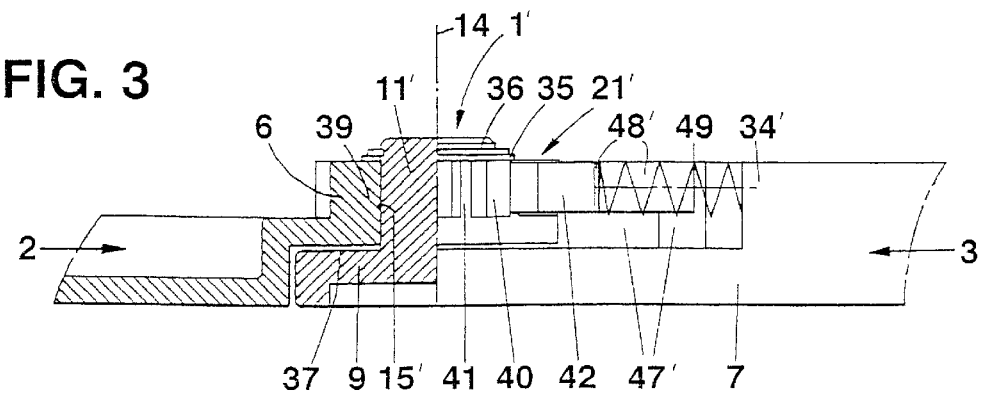
FIG. 3 shows a view of the second embodiment of the swiveling articulation taken along line III—III of FIG. 2.
Figure 5:
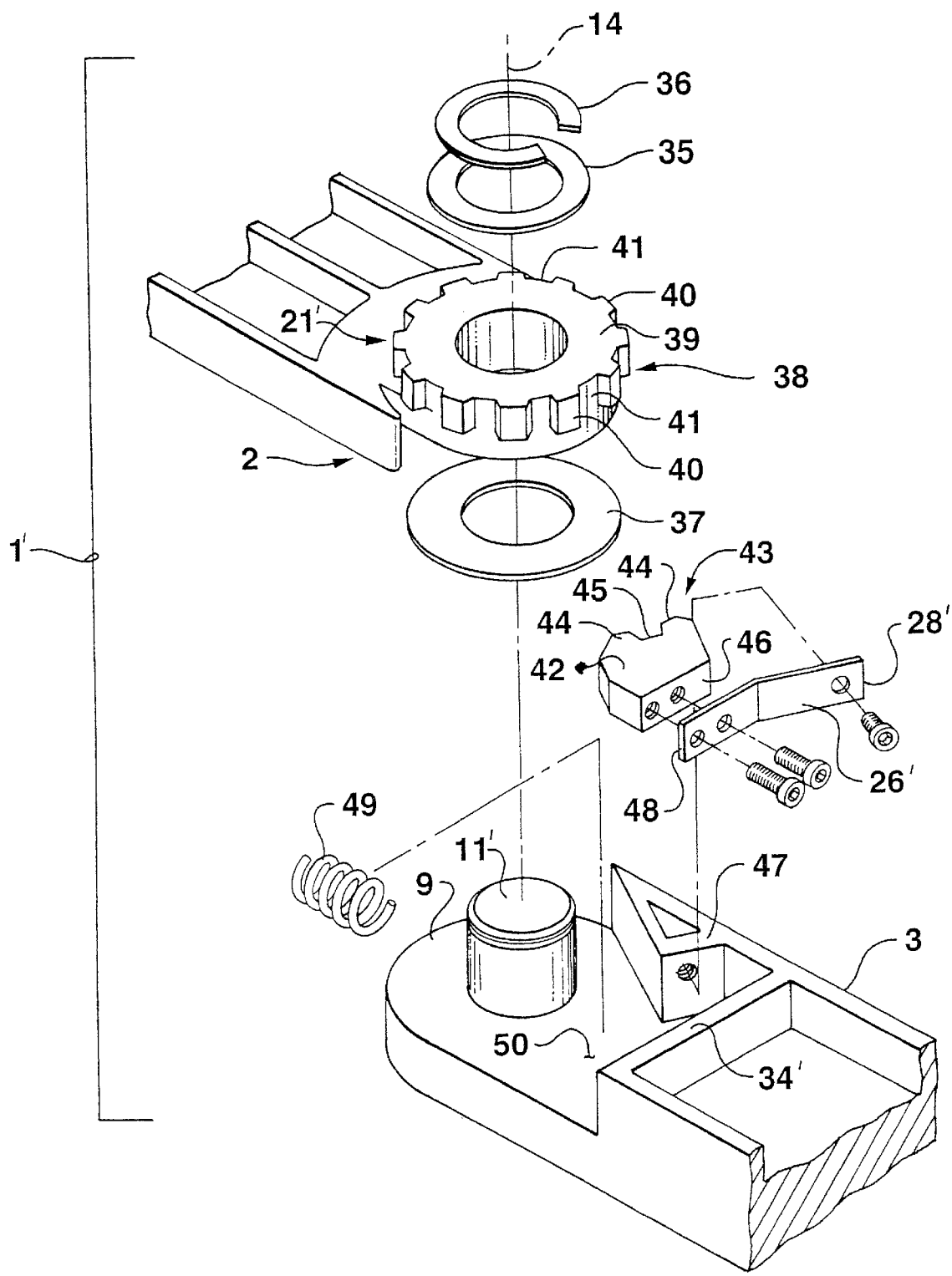
FIG. 5 shows an exploded perspective view of the embodiment of FIGS. 2 and 3.

In the embodiment shown in FIGS. 2, 3 and 5 a snap-in device 21' is provided, in which the snap-in meshing is radial. The difference in this respect from the embodiment shown in FIG. 1 shall be explained in further detail below. To avoid repetition it is however pointed out that the swivel articulation 1' of the embodiment according to FIGS. 2 and 3 is installed in the same manner between two arm segments 2, 3 of a mirror holding arm. For this reason matching components are given identical reference numbers in both embodiments and require no further explanation.

The swivel bearing in the embodiment according to FIGS. 2 and 3 is effected by an axle stump 11' which completely traverses a bearing bore 15', thereby comprising an axle member. A snap ring (or securing member) 36 is placed on the end of axle stump 11' with an interposed spring washer 35, so that the two arm segments 2, 3 are connected to each other in the area of the swivel articulation practically without clearance and in an articulated manner. In order to reduce friction between the two bearing partners, a gliding disk ring 37 threaded on the axle stump 11' is provided between the underside and the upper side of the arm segments 2, 3.

The snap-in element on the arm segment 2 is a row of snap-in teeth 38 which extends over the circumferential surface of a bearing element 39 forming the bearing bore 15' at the end 6 of the arm segment 2. This row of snap-in teeth 38 has trapezoidal snap-in teeth 40 in profile which leave snap-in recesses 41 between them.

The counter-snap-in element is a counter-snap-in block 42 which is provided with face teeth (generally) 43 which complement the row of snap-in teeth 38, and which specifically has two snap-in teeth 44 with a snap-in recess 45 between them. On the back 46 away from the face teeth 43 a leaf spring bearing brace 26' is again connected at its free end, its fixed end 28' being attached to a projection 47 of the inner contour of the arm segment 3. The attachment between bearing brace 26' and counter-snap-in block 42 and projection 47 can be effected as in FIG. 1 through screwing or riveting, suitable clamping, etc. Finally it should be pointed out that, in the embodiment according to FIG. 1 or 2 and 3, both bearing braces 26, 26' can also constitute and thus include the counter-snap-in profile itself. Thus, for example, the bearing brace 26' can be configured in continuation of its free end according to the contour of the counter-snap-in block 42, so that the latter would be an integral part of the bearing brace.

As FIGS. 2 and 3 clearly show, the bearing brace 26' is in addition supported between its crimped free end 48 and a counter-bearing 34' in the arm segment 3 by a coiled pressure spring 49. The counter-snap-in block 42 with bearing brace 26' and coiled pressure spring 49 are then located in a compartment-like recess 50 in the arm segment 3.

It should again be stated briefly, concerning the function of the snap-in device 21', that e.g. the extended position of the two arm segments 2, 3 shown in FIGS. 2 and 3 is suspended when torque is applied to the arm segment 3 in that this torque is transmitted via bearing brace 26' to the counter-snap-in block 42. The latter is correspondingly lifted with its face teeth 43 moving from the row of snap-in teeth 38 against the force of the spring by the bearing brace 26' and the coiled compression spring 49. Consequently a swiveling movement until the face teeth 43 and the row of snap-in teeth 38 engage each other with one or more teeth offset. It can again be seen that the bearing brace 26' ensures a mobility of the counter-snap-in block 42 which is independent of the arm segment 3, so that with the excursion movement of the snap-in no axial change in the positions of the two arm segments 2, 3 relative to each other occurs.

Also in the second embodiment, the overall snap-in mechanism remains within the cross-sectional contour of the arm segments 2, 3 as can be clearly seen when viewing FIGS. 2 and 3 together.

It will be apparent to those skilled in the art that various modifications and variations can be made in the present invention without departing from the scope and spirit of the invention. It is intended that the present invention include such modifications and variations as come within the scope of the appended claims and their equivalents.

We claim:

1. An assembly for adjustably mounting an external mirror to a vehicle, the assembly comprising:
   a first arm segment for securing to the vehicle;
   a second arm segment for securing to the external mirror;
   an axle member secured to one of the first and second arm segments and extending through at opening defined through the other of the first and second arm segments, the axle member defining a swivel axis therethrough and the first and second arm segments being pivotable and adjustably securable relative to each other about the swivel axis;
   a securing member attached to the axle member for securing the first and second arm segments together about the axle member;
   a bearing brace having a fixed end secured to the one of the first and second arm segments and a free end extending from the fixed end, the bearing brace configured and secured so as to extend in the direction of a plane substantially parallel to the swivel axis and to extend spaced from the swivel axis, the bearing brace forming a leaf spring acting substantially perpendicular to the swivel axis;
   a plurality of teeth non-pivotably fixed to and extending from a first surface disposed on the free end of the bearing brace toward the other of the first and second arm segments; and
   a plurality of grooves defined in a second surface opposing the first surface, the second surface being disposed on the other of the first and second arm segments to which the bearing brace fixed end is not secured, the grooves for receiving the teeth in any of at least two different adjustable orientations to thereby adjustably secure the first arm segment to the second arm segment.

2. The assembly of claim 1, further including at least one spring for axially urging the first and second arm segments together.

3. The assembly of claim 1, further including at least one spring further urging the leaf spring to act substantially perpendicular to the swivel axis.

4. The assembly of claim 1, wherein the second surface in which the grooves are defined is a circumferential that extends radially about the swivel axis.

5. The assembly of claim 1, wherein the securing member includes a snap ring.

6. The assembly of claim 1, further including at least one ring disposed around the axle member and between the first and second arm segments to reduce friction due to relative rotation between the first and second arm segments.

7. An assembly for adjustably mounting an external mirror to a vehicle, the assembly comprising;
   a first arm segment for securing to the vehicle;
   a second arm segment for securing to the external mirror;
   an axle member secured to one of the first and second arm segments and extending through an opening defined through the other of the first and second arm segments, the axle member defining a swivel axis therethrough and the first and second arm segments being pivotable and adjustably securable relative to each other about the swivel axis;
   a securing member attached to the axle member for securing the first and second arm segments together about the axle member;
   a bearing brace having a fixed end secured to the one of the first and second arm segments and a free end extending from the fixed end, the bearing brace configured and secured so as to extend in the direction of a plane substantially parallel to the swivel axis and to form a leaf spring acting substantially perpendicular to the swivel axis;
   a plurality of teeth non-pivotably fixed to and extending from a first surface disposed on either the free end of the bearing brace or the other of the first and second arm segments; and
   a plurality of grooves non-pivotably defined in a second surface opposing the first surface, the second surface being disposed on either the free end of the bearing brace or the other of the first and second arm segments, the grooves for receiving the teeth in any of at least two different adjustable orientations to thereby adjustably secure the first arm segment to the second arm segment.

8. The assembly of claim 7, wherein the second surface in which the grooves are defined is a circumferential surface that extends radially around the swivel axis.

9. The assembly of claim 8, wherein the circumferential surface is disposed about a substantially disk-shaped bearing element mounted about the axle member so as to be rotatable relative to the swivel axis and nonrotatable relative to the other of the first and second arm segments.

10. The assembly of claim 7 wherein the bearing brace is secured to the one of the first and second arm segments by screws.

11. The assembly of claim 7, wherein the teeth define a substantially trapezoidal cross-section.

12. The assembly of claim 7, wherein the grooves define a substantially trapezoidal cross-section.

13. An assembly for adjustably mounting an external mirror to a vehicle, the assembly comprising:
   a first arm segment for securing to the vehicle;
   a second arm segment for securing to the external mirror;
   at least one spring for axially urging the first and second arm segments together;
   at axle member secured to one of the first and second arm segments and extending through an opening defined through the other of the first and second arm segments, the axle member defining a swivel axis therethrough and the first and second arm segments being pivotable and adjustably securable relative to each other about the swivel axis;
   a securing member attached to the axle member for securing the first and second arm segments together about the axle member;

a bearing brace having a fixed end secured to the one of the first and second arm segments and a free end extending from the fixed end, the bearing brace configured and secured so as to extend in the direction of a plane substantially parallel to the swivel axis and to extend spaced from the swivel axis, the bearing brace forming a leaf spring acting substantially perpendicular to the swivel axis;

a plurality of teeth extending from a first surface disposed on the free end of the bearing brace toward the other of the first and second arm segments; and a plurality of grooves defined in a second surface opposing the first surface, the second surface being disposed on the other of the first and second arm segments to which the bearing brace fixed end is not secured, the grooves for receiving the teeth in any of at least two different adjustable orientations to thereby adjustably secure the first arm segment to the second arm segment.

14. The assembly of claim 13, further including at least one spring further urging the leaf spring to act substantially perpendicular to the swivel axis.

15. The assembly of claim 13, wherein the second surface in which the grooves are defined is a circumferential surface that extends radially about the swivel axis.

16. The assembly of claim 13, wherein the securing member includes a snap ring.

17. The assembly of claim 13, further including at least one ring disposed around the axle member and between the first and second arm segments to reduce friction due to relative rotation between the first and second arm segments.

18. The assembly of claim 15, wherein the circumferential surface is disposed about a substantially disk-shaped by element mounted about the axle member so as to be rotatable relative to the swivel axis and nonrotatable relative to the other of the first and second arm segments.

19. The assembly of claim 13, wherein the bearing brace is secure to the one of the first and second arm segments by screws.

20. The assembly of claim 13, wherein the teeth define a substantially trapezoidal cross-section.

21. The assembly of claim 13, wherein the grooves define a substantially trapezoidal cross-section.

22. An assembly for adjustably mounting an external mirror to a vehicle, the assembly comprising:

a first arm segment for securing to the vehicle;

a second arm segment for securing to the external mirror;

an axle member secured to one of the first and second arm segments and extending through an opening defined through the other of the first and second arm segments, the axle member defining a swivel axis therethrough and the first and second arm segments being pivotable and adjustably securable relative to each other about the swivel axis;

a snap ring attached to the axle member for securing the first and second arm segments together about the axle member;

a bearing brace having a fixed end secured to the one of the first and second arm segments and a free end extending from the fixed end, the bearing brace configured and secured so as to extend in the direction of a plane substantially parallel to the swivel axis and to extend spaced from the swivel axis, the bearing brace forming a leaf spring acting substantially perpendicular to the swivel axis;

a plurality of teeth and extending from a first surface disposed on the free end of the beating brace toward the other of the first and second arm segments; and a plurality of grooves defined in a second surface opposing the first surface, the second surface being disposed on the other of the first and second arm segments to which the bearing brace fixed end is not secured, the grooves for receiving the teeth in any of at least two different adjustable orientations to thereby adjustably secure the first arm segment to the second arm segment.

23. The assembly of claim 22, further including at least one spring further urging the leaf spring to act substantially perpendicular to the swivel axis.

24. The assembly of claim 22, wherein the second surface in which the grooves are defined is a circumferential surface that extends radially about the swivel axis.

25. The assembly of claim 22, further including at least one ring disposed around the axle member and between the first and second arm segments to reduce friction due to relative rotation between the first and second arm segments.

26. The assembly of claim 24, wherein the circumferential surface is disposed about a substantially disk-shaped bearing element mounted about the axle member so as to be rotatable relative to the swivel axis and nonrotatable relative to the other of the first and second arm segments.

27. The assembly of claim 22, wherein the bearing brace is secured to the one of the first and second arm segments by screws.

28. The assembly of claim 22, wherein the teeth define a substantially trapezoidal cross-section.

29. The assembly of claim 22, wherein the grooves define a substantially trapezoidal cross-section.

* * * * *

UNITED STATES PATENT AND TRADEMARK OFFICE
CERTIFICATE OF CORRECTION

PATENT NO.   : 6,349,916 B1
DATED        : February 26, 2002
INVENTOR(S)  : Heinrich Lang and Albrecht Popp It is certified that error appears in the above-identified patent and that said Letters Patent is hereby corrected as shown below:

Column 5,
Line 62, after "circumferential" add -- surface --.

Column 7,
Line 37, change "secure" to -- secured --.

Column 8,
Line 16, delete "and".

Signed and Sealed this

Third Day of September, 2002

Attest:

Attesting Officer

JAMES E. ROGAN
Director of the United States Patent and Trademark Office